US012114346B2

(12) United States Patent
Guo

(10) Patent No.: US 12,114,346 B2
(45) Date of Patent: Oct. 8, 2024

(54) METHOD AND APPARATUS FOR UPLINK INFORMATION TRANSMISSION AND USER EQUIPMENT

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 314 days.

(21) Appl. No.: 17/582,166

(22) Filed: Jan. 24, 2022

(65) Prior Publication Data
US 2022/0191890 A1 Jun. 16, 2022

Related U.S. Application Data

(63) Continuation of application No. PCT/CN2020/110824, filed on Aug. 24, 2020.

(60) Provisional application No. 62/902,583, filed on Sep. 19, 2019.

(51) Int. Cl.
*H04W 72/566* (2023.01)

(52) U.S. Cl.
CPC .................................. *H04W 72/566* (2023.01)

(58) Field of Classification Search
CPC ... H04W 72/50; H04W 72/56; H04W 72/566; H04W 72/569
See application file for complete search history.

(56) References Cited

U.S. PATENT DOCUMENTS

| 11,729,779 B2* | 8/2023 | Kang | H04L 5/0094 |
| | | | 370/329 |
| 2019/0261280 A1 | 8/2019 | Jung et al. | |
| 2020/0178338 A1* | 6/2020 | Ahn | H04B 7/0617 |
| 2022/0287054 A1* | 9/2022 | Kim | H04W 72/569 |

FOREIGN PATENT DOCUMENTS

| CN | 109889316 A | 6/2019 |
| WO | WO 2018/075188 A1 | 4/2018 |
| WO | WO 2018/230862 A1 | 12/2018 |
| WO | WO 2019/098798 A1 | 5/2019 |

OTHER PUBLICATIONS

"Vivo: "UCI enhancements for URLLC", 3GPP Draft; R1~1904082 UCI Enhancements". Technical Fields | For URLLC, 3rd Generation Partnership Searched UFC)Aug. 16, 2019 (Aug. 16, 2019), XPOS2765535, | [Retrieved from the Internet: [{retrieved on Apr. 3, 2019] | | (Year: 2019).*

(Continued)

*Primary Examiner* — Cheikh T Ndiaye
(74) *Attorney, Agent, or Firm* — Sheppard, Mullin, Richter & Hampton LLP

(57) ABSTRACT

Disclosed is a method and apparatus for uplink information transmission. In the method, a user equipment (UE) determines a priority rule and transmits at least one of first uplink information or second uplink information based on the priority rule, the first uplink information includes a first scheduling request (SR) that is dedicatedly configured for serving cell (SCell) beam failure recovery.

15 Claims, 2 Drawing Sheets

(56) References Cited

OTHER PUBLICATIONS

European Search Report for European Patent Application No. 20865376.6, dated Jun. 24, 2022.
Asia Pacific Telecom, R1-1908928, "Discussion on Multi-beam Operations," 3GPP TSG-RAN WG1 Meeting #98, Prague, CZ, Aug. 26-30, 2019.
Samsung, RP-191953, "Enhancements on MIMO for NR," 3GPP TSG RAN meeting #85, Newport Beach, USA, Sep. 16-20, 2019.
First Office Action in Chinese Patent Application No. 202210089523. 2, dated Apr. 8, 2023.
English translation of International Search Report of PCT/CN2020/ 110824, mailed from China National Intellectual Property Administration on Nov. 27, 2020.
Vivo, "UCI enhancements for URLLC," R1-1904082, 3GPP TSG RAN WG1 #96bis, Xi'an, China, Apr. 8-12, 2019.
Nokia, "On UCI Enhancements for NR URLLC," R1-1912512, 3GPP TSG RAN WG1 #99, Reno, USA, Nov. 18-22, 2019.
InterDigital Inc., "BFR on SCell," R2-1806821, 3GPP TSG-RAN WG2, RAN2#102, Busan, Republic of Korea, May 21-25, 2018.
Qualcomm Incorporated, "Procedures and MAC CE design for BFR for SCells," R2-1916067 Reno, Nevada, US, Nov. 18-22, 2019 Revision of R2-1913833 (Revision of R2-1913833), 3GPP TSG-RAN WG2 Meeting #108, Reno, Nevada, US, Nov. 18-22, 2019.

3rd Generation Partnership Project; Technical Specification Group Radio Access Network, NR; Physical channels and modulation (Release 15), 3GPP TS 38.211 V15.5.0 (Mar. 2019).
3rd Generation Partnership Project; Technical Specification Group Radio Access Network; NR; Multiplexing and channel coding (Release 15), 3GPP TS 38.212 V15.5.0 (Mar. 2019).
3rd Generation Partnership Project; Technical Specification Group Radio Access Network; NR; Physical layer procedures for control (Release 15), 3GPP TS 38.213 V15.5.0 (Mar. 2019).
3rd Generation Partnership Project; Technical Specification Group Radio Access Network; NR; Physical layer procedures for data (Release 15), 3GPP TS 38.214 V15.5.0 (Mar. 2019).
3rd Generation Partnership Project; Technical Specification Group Radio Access Network; NR; Physical layer measurements (Release 15), 3GPP TS 38.215 V15.5.0 (Jun. 2019).
3rd Generation Partnership Project; Technical Specification Group Radio Access Network; NR; Medium Access Control (MAC) protocol specification (Release 15), 3GPP TS 38.321 V15.5.0 (Mar. 2019).
3rd Generation Partnership Project; Technical Specification Group Radio Access Network; NR; Radio Resource Control (RRC) protocol specification (Release 15), 3GPP TS 38.331 V15.5.0 (Mar. 2019).

* cited by examiner

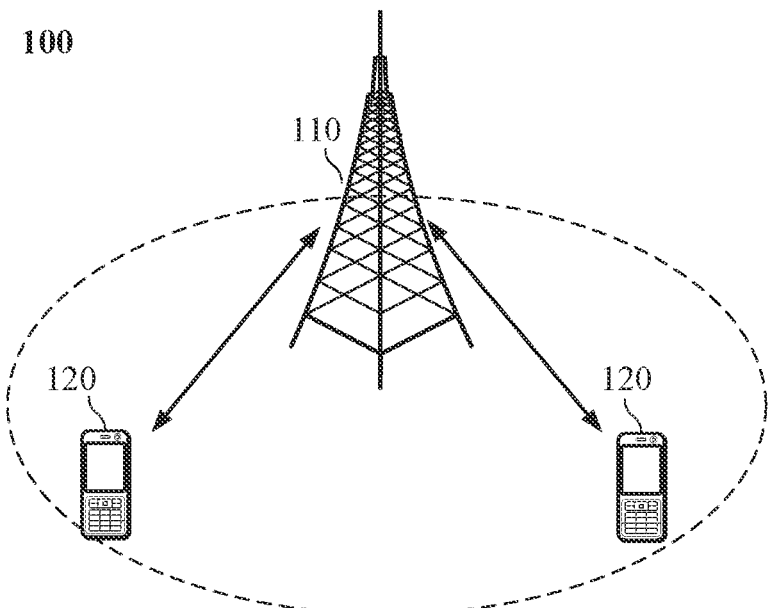

METHOD AND APPARATUS FOR UPLINK INFORMATION TRANSMISSION AND USER EQUIPMENT

CROSS REFERENCE TO RELATED APPLICATION

This application is a continuation application of International Application No. PCT/CN2020/110824, filed on Aug. 24, 2020, which claims priority to U.S. Provisional Application No. 62/902,583, filed on Sep. 19, 2019 and entitled "Methods an apparatus of scheduling request for SCell Beam failure recovery". The present application claims priority and the benefit of the above-identified applications and the above-identified applications are incorporated by reference herein in their entireties.

TECHNICAL FIELD

The disclosure relates to the field of mobile communications, and in particular to a method and apparatus for uplink information transmission and a user equipment.

BACKGROUND

In New Radio (NR) specification release 15, there are three types of uplink transmission carried in a physical uplink control channel (PUCCH): scheduling request (SR), hybrid automatic repeat request-acknowledgement (HARQ-ACK) transmission and channel status information (CSI) reports. The NR specification specifies priority rules and multiplexing method when two or more uplink transmissions in PUCCH collides in at least one orthogonal frequency division multiplexing (OFDM) symbol.

The current design specifies the user equipment (UE) behavior of multiplexing normal SR, HARQ-ACK for enhanced mobile broadband (eMBB) and CSI reports. SR for serving cell (SCell) beam failure recovery (BFR) is newly introduced to support the function of SCell BFR. However, the current design does not consider the case where one of SRs is configured to be a special SR for SCell BFR and the SR for SCell BFR shall have a different priority from that of a normal SR due to the different latency requirement for uplink (UL) grant to carry SCell beam failure recovery request (BFRQ) and eMBB physical uplink shared channel (PUSCH). Further, the current design does not consider the cases where an SR for SCell BFR overlaps with an SR for ultra reliable low latency communication (URLLC) or HARQ-ACK for URLLC.

SUMMARY

Implementations of the present disclosure provide a method and apparatus for uplink information transmission, and a user equipment.

Some implementations of the present disclosure provide a method for uplink information transmission. The method includes: determining, by a user equipment (UE), a priority rule; and transmitting, by the UE, at least one of first uplink information or second uplink information based on the priority rule, wherein the first uplink information comprises a first scheduling request (SR), which is an SR that is dedicatedly configured for serving cell (SCell) beam failure recovery.

Some implementations of the present disclosure provide an uplink information transmission apparatus, applied to a UE. The apparatus includes: a determination unit, configured to determine a priority rules; a transmission unit, configured to transmit at least one of first uplink information or second uplink information based on the priority rule; wherein the first uplink information comprises a first scheduling request (SR), which is an SR that is dedicatedly configured for serving cell (SCell) beam failure recovery.

Some implementations of the present disclosure provide a user equipment, which includes a processor and a memory storing a computer program, the processor is configured to call and run the computer program stored in the memory, to execute the above method for uplink information transmission.

Some implementations of the present disclosure provide a chip for implementing the above method for uplink information transmission.

Specifically, the chip includes a processor for calling a computer program from the memory and running the computer program, to cause the device installed with the chip to execute the above method for uplink information transmission.

Some implementations of the present disclosure provide a computer-readable storage medium, in which a computer program is stored, the computer program enables the computer to execute the above method for uplink information transmission.

Some implementations of the present disclosure provide a computer program product comprising computer program instructions, and the computer program instructions cause the computer to execute the above method for uplink information transmission.

Some implementations of the present disclosure provide a computer program, which, when running on a computer, causes the computer to execute the above method for uplink information transmission.

In the above technical solutions, the concept of the first SR (ie, SR of SCell BFR) is proposed. Further, the priority rule related to the first SR is determined, and the UE transmits at least one of the first SR or the second uplink based on the priority rule, so as to ensure the transmission efficiency of uplink information with a higher priority.

BRIEF DESCRIPTION OF DRAWINGS

The accompanying drawings described herein which form a part of the disclosure are provided for the better understanding of the disclosure, and exemplary implementations of the disclosure and description thereof serve to illustrate the disclosure but are not to be construed as improper limitations to the disclosure. In the accompanying drawings:

FIG. 1 illustrates a schematic diagram of a communication system architecture according to an implementation of the present disclosure.

FIG. 2 illustrates a schematic flowchart of a method for uplink information transmission according to an implementation of the present disclosure.

FIG. 3 illustrates a schematic structural diagram of an apparatus for uplink information transmission according to an implementation of the present disclosure.

DETAILED DESCRIPTION

Figure 4:
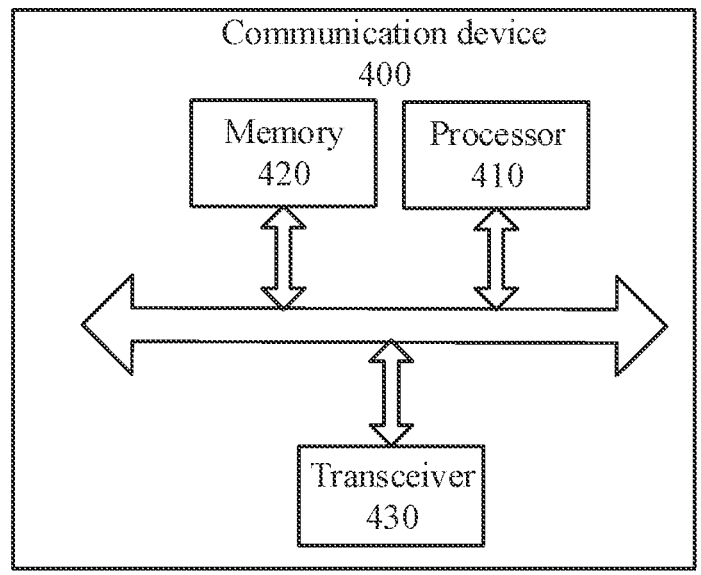
FIG. 4 illustrates a block diagram of a communication device according to an implementation of the present disclosure.

The technical solutions in the implementations of the disclosure will be described below in combination with the drawings in the implementations of the disclosure. It is apparent that the described implementations are not all implementations but part of implementations of the disclosure. All other implementations obtained by those of ordinary skill in the art based on the implementations in the disclosure without creative work shall fall within the scope of protection of the disclosure.

The technical solutions of the implementations of the present disclosure may be applied to various communication systems, for example: Long Term Evolution (LTE) system, LTE Frequency Division Duplex (FDD) system, LTE Time Division Duplex (TDD) system, 5G communication system or future communication system, etc.

Exemplarily, the communication system 100 applied in the implementation of the present disclosure is illustrated in FIG. 1. The communication system 100 may include a network device 110, and the network device 110 may be a device that communicates with a terminal 120 (or referred to as a communication terminal, or a terminal). The network device 110 can provide communication coverage for a specific geographic area, and can communicate with terminals located within the coverage area. Alternatively, the network device 110 may be an evolutionary Node B (eNB or eNodeB) in the LTE system, or a wireless controller in a cloud radio access network (Cloud Radio Access Network, CRAN), or the network device may be a mobile switching center, a relay station, an access point, an in-vehicle device, a wearable device, a hub, a switch, a bridge, a router, a network-side device in a 5G network, or a network device in a future communication system.

The communication system 100 further includes at least one terminal 120 located within the coverage of the network device 110. As used herein, "terminals" include, but are not limited to, connections via wired lines, such as via Public Switched Telephone Networks (PSTN), Digital Subscriber Lines (DSL), digital cables, and direct cable connections; and/or another data connection/network; and/or via a wireless interface, such as cellular networks, wireless local area networks (WLAN), digital TV networks such as DVB-H networks, satellite networks, AM-FM Broadcast transmitter; and/or another terminal is arranged to receive/transmit communication signals; and/or Internet of Things (IoT) equipment. A terminal configured to perform communication through a wireless interface may be referred to as a "wireless communication terminal", "wireless terminal", or "mobile terminal". Examples of mobile terminals include, but are not limited to, satellites or cellular telephones; Personal Communications System (PCS) terminals that can combine cellular radiotelephones with data processing, facsimile, and data communication capabilities; PDAs including mobile phones, pagers, Internet/internal network access, web browser, notepad, calendar, and/or Global Positioning System (GPS) receiver; conventional laptop and/or palm-type receivers; or other electronic devices including wireless transceivers. The terminal may an access terminal, a user equipment (UE), a subscriber unit, a user station, a mobile station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), or a handheld device with a wireless communication function, a computing device or other processing device connected to a wireless modem, an in-vehicle device, a wearable device, a terminals in a 5G network, or a terminal in a future evolved PLMN, and etc.

Alternatively, device-to-device (Device to Device, D2D) communication may be performed between the terminals 120.

Alternatively, the 5G communication system or 5G network may also be referred to as a New Radio (NR) system or an NR network.

FIG. 1 exemplarily illustrates one network device and two terminals. Alternatively, the communication system 100 may include multiple network devices, and each network device may include other numbers of terminals within the coverage area. Implementations of the present disclosure make no limits on this.

Alternatively, the communication system 100 may further include other network entities such as a network controller and a mobility management entity, which is not limited in the implementations of the present disclosure.

It should be understood that the devices with communication functions in the network/system in the implementations of the present disclosure may be referred to as communication devices. Taking the communication system 100 illustrated in FIG. 1 as an example, the communication device may include a network device 110 and a terminal 120 having a communication function, and the network device 110 and the terminal 120 may be the specific devices described above, which will not be elaborated herein for brevity. The communication device may further include other devices in the communication system 100, such as network controllers, mobility management entities, and other network entities, which are not limited in the implementations of the present disclosure.

It should be understood that the terms "system" and "network" are often used interchangeably herein. The term "and/or" in this article is just an association relationship that describes an associated object, indicating that there can be three relationships, for example, A and/or B, which can mean: A exists alone, A and B exist at the same time, B exists alone. In addition, the character "/" in this article generally indicates that the related objects before and after the character "/" have an "or" relationship.

To facilitate understanding of the technical solutions of the implementations of the present disclosure, the technical solutions related to the implementations of the present disclosure will be described below.

In NR specification release 15, there are three types of uplink transmission carried in PUCCH: scheduling request (SR), HARQ-ACK transmission and CSI reports. NR specification specifies the priority rules and multiplexing method when two or more uplink transmissions in PUCCH collides in at least one OFDM symbol. For the PUCCH resource, a UE can be configured with four sets of PUCCH resources for UCI transmission:

a first set of PUCCH resources with pucch-ResourceSetId=0 if $O_{UCI} \leq 2$ including 1 or 2 HARQ-ACK information bits and a positive or negative SR on one SR transmission occasion if transmission of HARQ-ACK information and SR occurs simultaneously, or a second set of PUCCH resources with pucch-ResourceSetId=1, if provided by higher layers, if $2 < O_{UCI} \leq N_2$ where $N_2$ is equal to maxPayloadMinus1 if maxPayloadMinus1 is provided for the PUCCH resource set with pucch-ResourceSetId=1; otherwise $N_2$ is equal to 1706, or a third set of PUCCH resources with pucch-ResourceSetId=2, if provided by higher layers, if $N_2<O_{UCI}\leq N_3$ where $N_3$ is equal to maxPayloadMinus1 if maxPayloadMinus1 is provided for the PUCCH resource set with pucch-ResourceSetId=2; otherwise $N_3$ is equal to 1706, or a fourth set of PUCCH resources with pucch-ResourceSetId=3, if provided by higher layers, if $N_3<O_{UCI}\leq 1706$.

In one PUCCH resource, the UE can transmit UCI using one of 5 different PUCCH formats: PUCCH format 0/1/2/3/4. The UCI transmission can be SR, HARQ-ACK transmission or CSI report.

For SR, the UE is configured with one or more SR configurations and each SR is a PUCCH transmission using either PUCCH format 0 or format 1. In each SR configuration, the UE is provided with the following configuration parameters: a PUCCH format 0 resource or a PUCCH format 1 resource, a periodicity and an offset value which are used to determine slot or symbol location for the SR transmission occasion in a PUCCH. The UE transmits a PUCCH in the PUCCH resource for the corresponding SR configuration only when the UE transmits a positive SR. For PUCCH transmission with HARQ-ACK information, the UE determines a PUCCH resource based on the PUCCH resource indicator field in the last scheduling DCI. For PUCCH transmission carrying CSI reporting, the UE is provided with a PUCCH resource in the CSI reporting configuration.

The UE is provided with UCI priority rule when SR transmission overlaps a HARQ-ACK transmission. When SR transmission overlaps with a HARQ-ACK transmission, HARQ-ACK generally have higher priority:

When HARQ-ACK in PUCCH format 0 overlaps with SR, the UE transmits the PUCCH in the resource using PUCCH format 0 for HARQ-ACK information. For PUCCH format 0 transmission, the UE use two parameters $m_0$ and $m_{CS}$ for computing a value of cyclic shift $\alpha$. The value $m_0$ is provided in the configuration of PUCCH resource and the UE determines the value $m_{CS}$ according the value of SR that overlaps with the PUCCH resource. Thus, the transmission of HARQ-ACK implicitly delivers the value of overlapped SR transmission.

When HARQ-ACK in PUCCH format 1 overlaps with SR, the UE shall determine the multiplexing procedure according the PUCCH format used by the SR. If SR uses PUCCH format 0, the UE drops SR transmission and only transmits HARQ-ACK in the resource using PUCCH format 1. If SR uses PUCCH format 1, the UE determines the multiplexing procedure according the value of SR. If the SR is positive, the UE transmits HARQ-ACK in the PUCCH resource configured for SR. If the SR is negative, the UE transmit HARQ-ACK in the PUCCH resource configured for HARQ-ACK transmission.

When HARQ-ACK in PUCCH format 2/3/4 overlaps with SR, the UE can append a few bits representing the negative or positive SRs to the HARQ-ACK UCI bits and then transmit the combined UCI bits in the PUCCH resource configured for HARQ-ACK transmission. Specially, $\lceil \log_2(K+1) \rceil$ bits representing a negative or positive SR, in ascending order of the values of schedulingRequestResourceId, are appended to the HARQ-ACK information bits and the UE transmits the combined $O_{UCI}=O_{ACK}+\lceil \log_2(K+1) \rceil$ UCI bits in a PUCCH using a resource with PUCCH format 2 or PUCCH format 3 or PUCCH format 4 that the UE determines as described in Subclauses 9.2.1 and 9.2.3. An all-zero value for the $\lceil \log_2(K+1) \rceil$ bits represents a negative SR value across all K SRs.

When SR overlaps with CSI reporting in PUCCH transmission, the UE append the bits of positive or negative SRs to the CSI UCI bits and then transmits the combined UCI bits in the PUCCH resource configured for CSI reporting. Specifically, If a UE would transmit a PUCCH with $O_{CSI}$ CSI report bits in a resource using PUCCH format 2 or PUCCH format 3 or PUCCH format 4 in a slot, $\lceil \log_2(K+1) \rceil$ bits representing corresponding negative or positive SR, in ascending order of the values of schedulingRequestResourceId, are prepended to the CSI information bits as described in Subclause 9.2.5.2 and the UE transmits a PUCCH with the combined $O_{UCI}=\lceil \log_2(K+1) \rceil O_{CSI}$ UCI bits in a resource using the PUCCH format 2 or PUCCH format 3 or PUCCH format 4 for CSI reporting. An all-zero value for the $\lceil \log_2(K+1) \rceil$ bits represents a negative SR value across all SRs.

The current design only specifies the UE behavior of multiplexing normal SR, HARQ-ACK for eMBB and CSI reports. SR for SCell BFR is newly introduced to support the function of SCell BFR. The current design does not consider the case where one of SR is configured to be the special SR for SCell BFR and the SR for SCell BFR shall have different priority as normal SR due to the different latency requirement for UL grant to carry SCell BFRQ and eMBB PUSCH. The current design does not consider the cases of that SR for SCell BFR overlaps with SR for URLLC or HARQ-ACK for URLLC.

To this purpose, the following technical solutions are proposed. In this disclosure, the methods of SR for SCell BFR (beam failure recovery) are presented. The SR for SCell BFR might overlap with SR for eMBB, SR for URLLC, HARQ-ACK for eMBB, HARQ-ACK for URLLC and CSI reporting in PUCCH transmission. Various priority rules and corresponding transmission methods are presented.

In one method, the SR of SCell BFR has lower priority than SR of URLLC and HARQ-ACK of URLLC but it has higher priority than SR of eMBB and HARQ-ACK of eMBB. The proposed priority order is: HARQ-ACK of URLLC>SR of URLLC>SR of SCell BFR>HARQ-ACK of eMBB>SR of eMBB. Additionally, the following methods are proposed:

The methods to multiplex SR of SCell BFR with HARQ-ACK of URLLC when HARQ-ACK of URLLC uses PUCCH format 0 or 1.

The methods to multiplex SR of SCell BFR with HARQ-ACK of eMBB when HARQ-ACK of eMBB uses PUCCH format 0 or 1.

The methods of multiplexing SR of URLLC, SR of SCell BFR and/or SR of eMBB with HARQ-ACK with PUCCH formats 2/3/4.

The methods of multiplexing SR of URLLC, SR of SCell BFR and/or SR of eMBB with CSI reporting with PUCCH formats 2/3/4 are also proposed.

The technical solutions of the implementations of the present disclosure will be described in detail below.

FIG. 2 illustrates a schematic flowchart of a method for uplink information transmission according to an implementation of the present disclosure. As illustrated in FIG. 2, the method for uplink information transmission includes the following actions:

In action 201, the UE determines a priority rule and transmits at least one of first uplink information or second uplink information based on the priority rule; where the first uplink information includes a first SR, which is an SR of SCell BFR.

In an implementation, the second uplink information may include at least one of the following:
- a second SR for enhanced mobile broadband (eMBB);
- a first hybrid automatic repeat request-acknowledgement (HARQ-ACK) for eMBB;
- a third SR for ultra reliable low latency communication (URLLC); or
- a second HARQ-ACK for URLLC.

In the above solution, the first SR may also be called SR of SCell BFR, the second SR may also be called SR of eMBB, and the first HARQ-ACK may also be called HARQ-ACK of eMBB. The third SR may also be called SR of URLLC, and the second HARQ-ACK may also be called HARQ-ACK of URLLC.

In the disclosure, the concept of SR of SCell BFR is proposed. In one implementation, a UE is provided with a configuration for SR of SCell BFR in PUCCH transmission using either PUCCH format 0 or PUCCH format 1. In the configuration, the UE can be provided at least the following configuration parameters:
- A PUCCH resource ID that identifies a PUCCH resource that uses either PUCCH format 0 or PUCCH format 1;
- A parameter to provide the periodicity for the transmission of SR of SCell BFR. It can be in slots or symbols;
- A parameter to provide the offset for the transmission of SR of SCell BFR.

In one method, for the configuration of SR of SCell BFR, the UE can be provided with a parameter in the configuration of a SR, which indicates the SR configuration is for SR of SCell BFR. As illustrated in the following example, a parameter usage is defined in SchedulingRequestResourceConfig. The SchedulingRequestResourceConfig provides the configuration of PUCCH resource where the UE may send the dedicated scheduling request. If the parameter usage is configured and set the value to ScellBFR, the UE can determine the schedule request configuration is used for SR of SCell BFR.

TABLE 1

| SchedulingRequestResourceConfig ::= | SEQUENCE { |
|---|---|
| schedulingRequestResourceId | |
| SchedulingRequestResourceId, | |
| schedulingRequestID | |
| SchedulingRequestId, | |
| periodicityAndOffset | CHOICE { |
| sym2 | NULL, |
| sym6or7 | NULL, |
| sl1 | NULL, |
| -- Recurs in every slot | |
| sl2 | INTEGER |
| (0..1), | |
| sl4 | INTEGER |
| (0..3), | |
| sl5 | INTEGER |
| (0..4), | |
| sl8 | INTEGER |
| (0..7), | |
| sl10 | INTEGER |
| (0..9), | |
| sl16 | INTEGER |
| (0..15), | |
| sl20 | INTEGER |
| (0..19), | |
| sl40 | INTEGER |
| (0..39), | |
| sl80 | INTEGER |
| (0..79), | |
| sl160 | INTEGER |
| (0..159), | |
| sl320 | INTEGER |
| (0..319), | |
| sl640 | INTEGER |
| (0..639) | |

TABLE 1-continued

| } | |
|---|---|
| OPTIONAL, -- Need M | |
| resource | PUCCH-ResourceId |
| OPTIONAL -- Need M | |
| usage | ENUMERATED{sCellBFR} |
| OPTIONAL | |
| } | |

In another method, the UE can be provided with a SR of SCell BFR configuration in the IE MAC-CellGroupConfig that is used to configure MAC parameters for a cell group.

TABLE 2

| MAC-CellGroupConfig ::= | SEQUENCE { |
|---|---|
| drx-Config | SetupRelease { |
| DRX-Config } | |
| OPTIONAL, -- Need M | |
| schedulingRequestConfig | |
| SchedulingRequestConfig | |
| OPTIONAL, -- Need M | |
| sCellBFRschedulingRequestConfig | |
| SCellBFRSchedulingRequestConfig | |
| OPTIONAL, -- Need M | |
| bsr-Config | BSR-Config |
| OPTIONAL, -- Need M | |
| tag-Config | TAG-Config |
| OPTIONAL, -- Need M | |
| phr-Config | SetupRelease { |
| PHR-Config } | |
| OPTIONAL, -- Need M | |
| skipUplinkTxDynamic | BOOLEAN, |
| ..., | |
| [[ | |
| csi-Mask | BOOLEAN |
| OPTIONAL, -- Need M | |
| dataInactivityTimer | SetupRelease |
| { DataInactivityTimer } | OPTIONAL |
| -- Cond MCG-Only | |
| ]] | |
| } | |
| SCellBFRSchedulingRequestConfig ::= | SEQUENCE { |
| periodicityAndOffset | CHOICE { |
| sym2 | NULL, |
| sym6or7 | NULL, |
| sl1 | NULL, |
| -- Recurs in every slot | |
| sl2 | INTEGER |
| (0..1), | |
| sl4 | INTEGER |
| (0..3), | |
| sl5 | INTEGER |
| (0..4), | |
| sl8 | INTEGER |
| (0..7), | |
| sl10 | INTEGER |
| (0..9), | |
| sl16 | INTEGER |
| (0..15), | |
| sl20 | INTEGER |
| (0..19), | |
| sl40 | INTEGER |
| (0..39), | |
| sl80 | INTEGER |
| (0..79), | |
| sl160 | INTEGER |
| (0..159), | |
| sl320 | INTEGER |
| (0..319), | |
| sl640 | INTEGER |
| (0..639) | |
| } | |
| OPTIONAL, -- Need M | |
| resource | PUCCH- |
| ResourceId | |
| OPTIONAL -- Need M | |
| } | |

As illustrated in the Table 2, RRC parameter IE SCellBFRSchedulingRequestConfig determines physical layer resources on PUCCH where the UE may send the dedicated SR of SCell BFR.

In one implementation, the UE is provided with priority rule between the SR of SCell BFR, SR of URLLC, HARQ-ACK of URLLC, SR of eMBB and HARQ-ACK of eMBB. When a transmission of SR of SCell BFR overlaps with a transmission of a PUCCH with SR of URLLC, or HARQ-ACK of URLLC, or SR of eMBB or HARQ-ACK of eMBB, the UE shall follow the provided priority rule to multiplex the SR of SCell BFR with the other colliding UCI or drop one of them. Regarding the transmission of those UCI in PUCCH, the UE can be requested to follow one or more of the following priority rules:

Priority Rule #1:

The priority rule is used for indicating that the priority of the first SR is higher than the priority of the third SR, the priority of the third SR is higher than the priority of the second HARQ-ACK, the priority of the second HARQ-ACK is higher than the priority of the first HARQ-ACK, and the priority of the first HARQ-ACK is higher than the priority of the second SR.

For ease of understanding, the priority order can be characterized by the following formula: SR of SCell BFR>SR of URLLC>HARQ-ACK of URLLC>HARQ-ACK of eMBB>SR of eMBB. Here, SR of SCell BFR has higher priority than SR of URLLC and HARQ-ACK of URLLC.

Priority Rule #2:

The priority rule is used for indicating that the priority of the third SR is higher than the priority of the first SR, the priority of the first SR is higher than the priority of the second HARQ-ACK, the priority of the second HARQ-ACK is higher than the priority of the first HARQ-ACK, and the priority of the first HARQ-ACK is higher than the priority of the second SR.

For ease of understanding, the priority order can be characterized by the following formula: SR of URLLC>SR of SCell BFR>HARQ-ACK of URLLC>HARQ-ACK of eMBB>SR of eMBB. Here, SR of URLLC has higher priority than SR of SCell BFR and the SR of SCell BFR has higher priority than HARQ-ACK of URLLC.

Priority Rule #3:

The priority rule is used for indicating that the priority of the third SR is higher than the priority of the second HARQ-ACK, and the priority of the second HARQ-ACK is higher than the priority of the first SR, the priority of the first SR is higher than the priority of the first HARQ-ACK, and the priority of the first HARQ-ACK is higher than the priority of the second SR.

For ease of understanding, the priority order can be characterized by the following formula: SR of URLLC>HARQ-ACK of URLLC>SR of SCell BFR>HARQ-ACK of eMBB>SR of eMBB. Here, SR of SCell BFR has lower priority than SR of URLLC and HARQ-ACK of URLLC but has higher priority than SR of eMBB and HARQ-ACK of eMBB.

Priority Rule #4:

The priority rule is used for indicating that the priority of the third SR is higher than the priority of the second HARQ-ACK, and the priority of the second HARQ-ACK is higher than the priority of the first HARQ-ACK, the priority of the first HARQ-ACK is higher than the priority of the first SR, and the priority of the first SR is higher than the priority of the second SR.

For ease of understanding, the priority order can be characterized by the following formula: SR of URLLC>HARQ-ACK of URLLC>HARQ-ACK of eMBB>R of SCell BFR>SR of eMBB. Here, SR of SCell BFR has lower priority than SR of URLCC and HARQ-ACK of both URLLC and eMBB but has higher priority than SR of eMBB.

Priority Rule #5:

The priority rule is used for indicating that the priority of the first SR is higher than the priority of the second HARQ-ACK, and the priority of the second HARQ-ACK is higher than the priority of the third SR, the priority of the third SR is higher than the priority of the first HARQ-ACK, and the priority of the first HARQ-ACK is higher than the priority of the second SR.

For ease of understanding, the priority order can be characterized by the following formula: SR of SCell BFR>HARQ-ACK of URLLC>SR of URLLC>HARQ-ACK of eMBB>SR of eMBB.

Priority Rule #6:

The priority rule is used for indicating that the priority of the second HARQ-ACK is higher than the priority of the first SR, the priority of the first SR is higher than the priority of the third SR, the priority of the third SR is higher than the priority of the first HARQ-ACK, and the priority of the first HARQ-ACK is higher than the priority of the second SR.

For ease of understanding, the priority order can be characterized by the following formula: HARQ-ACK of URLLC>SR of SCell BFR>SR of URLLC>HARQ-ACK of eMBB>SR of eMBB.

Priority Rule #7:

The priority rule is used for indicating that the priority of the second HARQ-ACK is higher than the priority of the third SR, and the priority of the third SR is higher than the priority of the first SR, the priority of the first SR is higher than the priority of the first HARQ-ACK, and the priority of the first HARQ-ACK is higher than the priority of the second SR.

For ease of understanding, the priority order can be characterized by the following formula: HARQ-ACK of URLLC>SR of URLLC>SR of SCell BFR>HARQ-ACK of eMBB>SR of eMBB Priority Rule #8:

The priority rule is used for indicating that the priority of the second HARQ-ACK is higher than the priority of the third SR, and the priority of the third SR is higher than the priority of the first HARQ-ACK, the priority of the first HARQ-ACK is higher than the priority of the first SR, and the priority of the first SR is higher than the priority of the second SR.

For ease of understanding, the priority order can be characterized by the following formula: HARQ-ACK of URLLC>SR of URLLC>HARQ-ACK of eMBB>SR of SCell BFR>SR of eMBB.

With the above priority rules, the UE can transmit uplink information in the following manner.

In an implementation, the priority of the first SR is lower than the priority of the third SR and the priority of the second HARQ-ACK; and, the priority of the first SR is higher than the priority of the second SR and the priority of the first HARQ-ACK. In the case that the first PUCCH for carrying the first SR and the second PUCCH for carrying HARQ-ACK information have an overlapping portion within one time slot, if the second PUCCH uses PUCCH format 0, the UE transmits at least one of the first SR or the HARQ-ACK information according to a first transmission mode; or, if the second PUCCH uses PUCCH format 1, the UE transmits at least one of the first SR or the HARQ-ACK information according to a second transmission mode.

The first transmission mode and the second transmission mode will be described below.

A) First transmission mode

Scheme 1: in the case that the HARQ-ACK information is of a type of the first HARQ-ACK or the second HARQ-ACK, if the first SR is a positive SR, the UE transmits the PUCCH in the resource using PUCCH format 0 in PRB(s) for HARQ-ACK information; or, if the first SR is a negative SR, the UE transmits the PUCCH in the resource using PUCCH format 0 for HARQ-ACK information as configured.

Scheme 2: in the case that the HARQ-ACK information is of a type of the first HARQ-ACK, if the first SR is a positive SR, the UE transmits the first SR on the first PUCCH; or, if the first SR is a negative SR, the UE transmits the HARQ-ACK information on the second PUCCH.

B) Second transmission mode

Scheme 3: in the case that the HARQ-ACK information is of a type of the second HARQ-ACK, if the first PUCCH uses PUCCH format 0, the UE transmits the HARQ-ACK information on the second PUCCH; or, if the first PUCCH uses PUCCH format 1, then: if the first SR is a positive SR, the UE transmits the HARQ-ACK information on the first PUCCH; or, if the first SR is a negative SR, the UE transmits the HARQ-ACK information on the second PUCCH.

Scheme 4: in the case that the HARQ-ACK information is of a type of the first HARQ-ACK, if the first SR is a positive SR, and if the first PUCCH uses PUCCH format 0, the UE transmits the first SR on the first PUCCH; or, if the first SR is a negative SR, and if the first PUCCH uses PUCCH format 1, the UE transmits the HARQ-ACK information on the first PUCCH; or, if the first SR is a negative SR, the UE transmits the HARQ-ACK information on the second PUCCH.

The above schemes 1 to 4 will be described in detail below.

In one method, the UE is configured with that SR of SCell BFR has lower priority than SR of URLLC and HARQ-ACK of URLLC and SR of SCell BFR has higher priority than SR of eMBB and HARQ-ACK of eMBB. When a PUCCH transmission occasion of SR of SCell BFR overlaps with a transmission of PUCCH with HARQ-ACK information in one slot, the UE can be requested to transmit the HARQ-ACK and/or SR of SCell BFR as follows:

1) If the HARQ-ACK information is in PUCCH resource using PUCCH format 0,

If the HARQ-ACK information is for URLLC transmission:

If the SR of SCell BFR is positive, the UE transmits the PUCCH in the resource using PUCCH format 0 in PRB(s) for HARQ-ACK information. The UE determines a value of $m_0$ and $m_{CS}$ for computing a value of cyclic shift α[4, TS 38.211] where $m_0$ is provided by initialcyclicshift of PUCCH-format0, and $m_{CS}$ is determined from the value of one HARQ-ACK information bit or from the values of two HARQ-ACK information bits as in Table 3a and 3b:

TABLE 3a

| HARQ-ACK Value | 0 | 1 |
|---|---|---|
| Sequence cyclic shift | $m_{CS} = 3$ | $m_{CS} = 9$ |

TABLE 3b

| HARQ-ACK Value | {0, 0} | {0, 1} | {1, 1} | {1, 0} |
|---|---|---|---|---|
| Sequence cyclic shift | $m_{CS} = 1$ | $m_{CS} = 4$ | $m_{CS} = 7$ | $m_{CS} = 10$ |

If the SR of SCell BFR is negative, the UE transmits the PUCCH in the resource using PUCCH format 0 for HARQ-ACK information as configured.

If the HARQ-ACK information is for eMBB transmission (i.e., not for URLLC transmission):

Alt#1: the UE follow the same procedure as HARQ-ACK of URLLC;

Alt#2: if the SR of SCell BFR is positive, the UE drops the HARQ-ACK of eMBB and transmits the PUCCH in the resource for SR of SCell BFR and if the SR of SCell BFR is negative, the UE transmits the PUCCH in the resource configured for HARQ-ACK of eMBB.

2) If the HARQ-ACK information is in PUCCH resource using PUCCH format 1:

If the HARQ-ACK information is for URLLC transmission:

If the PUCCH configured for SR of SCell BFR is PUCCH format 0, the UE drops the transmission of SR of SCell BFR and transmits HARQ-ACK in the PUCCH resource configured for HARQ-ACK.

If the PUCCH configured for SR of SCell BFR is a PUCCH format 1, the UE transmit HARQ-ACK in the PUCCH resource configured for SR of SCell BFR if the SR of SCell BFR is positive and the UE transmits HARQ-ACK in the PUCCH resource configured for HARQ-ACK if the SR of SCell BFR is negative.

If the HARQ-ACK information is for eMBB transmission:

If the SR of SCell BFR is positive and the PUCCH configured for SR of SCell BFR is PUCCH format 0, the UE transmit SR of SCell BFR in the PUCCH resource configured for SR of SCell BFR and does not transmit HARQ-ACK of eMBB.

If the SR of SCell BFR is negative and the PUCCH configured for SR of SCell BFR is PUCCH format 1, the UE transmit HARQ-ACK of eMBB in the PUCCH resource configured for SR of SCell BFR.

If the SR of SCell BFR is negative, the UE transmit HARQ-ACK in the PUCCH resource configured for HARQ-ACK.

In an implementation, the priority of the first SR is lower than the priority of the third SR, and the priority of the first SR is higher than the priority of the second SR.

Scheme 5: in the case that the transmission opportunity for carrying the third SR and the transmission opportunity for carrying the first SR have an overlapping portion within one slot or sub-slot, if the third SR is a positive SR, the UE discards the first SR; or, if the third SR is a negative SR and the first SR is a positive SR, the UE transmits the first SR.

Scheme 6: in the case that the transmission opportunity for carrying the second SR and the transmission opportunity for carrying the first SR have an overlapping part in one time slot or sub-time slot, if the first SR is a positive SR, the UE discards the second SR; or, if the first SR is a negative SR and the second SR is a positive SR, the UE transmits the second SR.

Scheme 7: in the case that the third SR is a positive SR, the UE reports a third SR, but does not report the first SR. Here, the PUCCH for carrying HARQ-ACK information and the transmission opportunity for carrying the first SR and the transmission opportunity for carrying the third SR have an overlapping portion, and the PUCCH for carrying HARQ-ACK information uses PUCCH format 2/3/4.

Scheme 8: in the case that the first SR is a positive SR, the UE reports the first SR, but does not report the second SR. Here, the PUCCH for carrying HARQ-ACK information and the transmission opportunity for carrying the first SR and the transmission opportunity for carrying the third SR have an overlapping portion, and the PUCCH for carrying HARQ-ACK information uses PUCCH format 2/3/4.

The above schemes 5 to 8 will be described in detail below.

In one method, the UE can be requested to assume SR of SCell BFR has higher priority than the SR of eMBB and the SR of SCell BFR has lower priority than the SR of URLLC. For the transmission of SR of URLLC, SR of eMBB and SR of SCell BFR, the UE can be requested to follow one or more of the followings:

If transmission occasion of a SR of URLLC overlaps transmission occasion of a SR of SCell BFR in a slot or a subslot, if the SR of URLLC is positive, the UE shall drop the transmission of SR of SCell BFR. If the SR of URLLC is negative and the SR of SCell BFR is positive, the UE can transmit the SR of SCell BFR.

If transmission occasion of a SR of eMBB overlaps transmission occasion of a SR of SCell BFR in a slot or a subslot, if the SR of SCell BFR is positive, the UE shall drop the transmission of SR of eMBB. If the SR of SCell BFR is negative and the SR of eMBB is positive, the UE can transmit the SR of eMBB.

If a HARQ-ACK transmission with PUCCH format 2/3/4 overlaps with a SR of URLLC and a SR of SCell BFR, if the SR of URLLC is positive, the UE shall report the positive SR for the SR of URLLC in the UCI transmission but not report the positive SR for the SR of SCell BFR.

If a HARQ-ACK transmission with PUCCH format 2/3/4 overlaps with a SR of eMBB and a SR of SCell BFR, if the SR of SCell BFR is positive, the UE shall report the positive SR for the SR of SCell BFR in the UCI transmission but not report the positive SR for the SR of eMBB.

If a CSI reporting transmission with PUCCH format 2/3/4 overlaps with a SR of URLLC and a SR of SCell BFR, if the SR of URLLC is positive, the UE shall report the positive SR for the SR of URLLC in the UCI transmission but not report the positive SR for the SR of SCell BFR.

If a CSI reporting transmission with PUCCH format 2/3/4 overlaps with a SR of eMBB and a SR of SCell BFR, if the SR of SCell BFR is positive, the UE shall report the positive SR for the SR of SCell BFR in the UCI transmission but not report the positive SR for the SR of eMBB.

Further, the implementations of the present disclosure also propose the following technical schemes:

Scheme I) In an implementation, in a case that the transmission resource for the target information and the transmission resource for the K SRs have an overlapping portion, where the K SRs include at least one first SR, at least one second SR, at least one third SR, or any combination thereof, K is a positive integer, the UE appends $\lceil \log_2(K+1) \rceil$-bit SR information to the O-bit target information to obtain O+$\lceil \log_2(K+1) \rceil$-bit uplink information;

the UE transmits the O+$\lceil \log_2(K+1) \rceil$-bit uplink information on the second PUCCH, wherein the second PUCCH is a PUCCH configured for the target information, and the second PUCCH uses PUCCH format 2/3/4.

Here, the target information is HARQ-ACK information, and accordingly, the O-bit target information is $O_{HARQ}$-bit HARQ-ACK information; or, the target information is CSI information, and accordingly, the O-bit target information is $O_{CSI}$-bit CSI information.

Scheme II) In an implementation, in a case that the transmission resource for the target information and $K_1$ first SR transmission resources, $K_2$ second SR transmission resources, and $K_3$ third SR transmission resources have an overlapping part, where $K_1$, $K_2$, and $K_3$ are positive integers, the UE appends the $\lceil \log_2(K_1+1) \rceil$-bit first SR information, the $\lceil \log_2(K_2+1) \rceil$-bit second SR information, and the $\lceil \log_2(K_3+1) \rceil$-bit third SR information to the O-bit target information, to obtain $\lceil \log_2(K_1+1) \rceil+\lceil \log_2(K_2+1) \rceil+\lceil \log_2(K_3+1) \rceil$+O-bit uplink information;

the UE transmits the $\lceil \log_2(K_1+1) \rceil+\lceil \log_2(K_2+1) \rceil+\lceil \log_2(K_3+1) \rceil$+O-bit uplink information on the second PUCCH, the second PUCCH is a PUCCH configured for the target information, and the second PUCCH uses PUCCH format 2/3/4.

Here, the target information is HARQ-ACK information, and accordingly, the O-bit target information is $O_{HARQ}$-bit HARQ-ACK information; or, the target information is CSI information, and accordingly, the O-bit target information is $O_{CSI}$-bit CSI information.

The above scheme I) and scheme II) will be described in detail below.

In one method, if the HARQ-ACK transmission is configured with a PUCCH format 2/3/4 and if the HARQ-ACK transmission overlaps with one or more of the SR of SCell BFR, SR of URLLC and SR of eMBB, the UE can be requested to operate one or more of the followings:

Alt#1: There are totally K PUCCH transmissions of SR of URLLC, SR of SCell BFR and SR of eMBB, the UE append $\lceil \log_2(K+1) \rceil$ bits to the HARQ-ACK information and the UE transmit the combined $O_{HARQ}$+$\lceil \log_2(K+1) \rceil$ bits in the PUCCH of PUCCH format 2/3/4 configured to the HARQ-ACK transmission, where $O_{HARQ}$ is the number of HARQ-ACK information bits. The value of $\lceil \log_2(K+1) \rceil$ represent a positive or negative SR for one of those K SR of URLLC, SR of SCell BFR and SR of eMBB.

In an implementation, $\lceil \log_2(K+1) \rceil$ bits representing a negative or positive SR, in ascending order of the values of schedule request ID configured in each of SR of URLLC, SR of SCell BFR and SR of eMBB.

In another implementation, the value of $\lceil \log_2(K+1) \rceil$ being k=1~K−1 representing a positive SR, for k-th SR configuration in ascending order of the values of schedule request ID configured in each of SR of URLLC and SR of eMBB. And the value of $\lceil \log_2(K+1) \rceil$ being K represent a positive in the SR of SCell BFR Among those SRs overlapping with the HARQ-ACK transmission, if one or more SR of URLLC is positive, the UE reports the positive for one SR of URLLC. If no SR of URLLC is positive but SR of SCell BFR is positive, the UE reports the positive for the SR of SCell BFR not matter the SR of eMBB is positive or negative.

Alt#2: There are K1 SR of URLLC, K2 SR of SCell BFR and K3 SR of eMBB that overlap with the HARQ-ACK transmission with PUCCH format 2/3/4, then the UE append $\lceil \log_2(K_1+1) \rceil + \lceil \log_2(K_2+1) \rceil + \lceil \log_2(K_3+1) \rceil$ bits to the HARQ-ACK information bits and the UE transmits totally $\lceil \log_2(K_1+1) \rceil + \lceil \log_2(K_2+1) \rceil + \lceil \log_2(K_3+1) \rceil + O_{HARQ}$ bits in the PUCCH resources configured for HARQ-ACK transmission.

Where $\lceil \log_2(K_1+1) \rceil$ bits representing a negative or positive SR, for those SR of URLLC in ascending order of the values of schedulingRequestResourceId of those SRs of URLLC.

Where $\lceil \log_2(K_1+1) \rceil$ bits representing a negative or positive SR, for those SR of SCell BFR in ascending order of the values of schedulingRequestResourceId of those SRs of SCell BFR.

In one example, the UE is configured with one SR of SCell BFR, then there is 1 bit representing a negative or positive SR for the SR of SCell BFR.

Where $\lceil \log_2(K_3+1) \rceil$ bits representing a negative or positive SR, for those SR of eMBB in ascending order of the values of schedulingRequestResourceId of those SRs of eMBB.

In one method, if the CSI reporting is configured with a PUCCH format 2/3/4 and if the CSI reporting PUCCH transmission overlaps with one or more of the SR of SCell BFR, SR of URLLC and SR of eMBB, the UE can be requested to operate one or more of the followings:

Alt#1: There are totally K PUCCH transmissions of SR of URLLC, SR of SCell BFR and SR of eMBB, the UE append $\lceil \log_2(K+1) \rceil$ bits to the CSI reporting information and the UE transmit the combined $O_{CSI} + \lceil \log_2(K+1) \rceil$ bits in the PUCCH of PUCCH format 2/3/4 configured to the HARQ-ACK transmission, where $O_{CSI}$ is the number of CSI information bits.

The value of $\lceil \log_2(K+1) \rceil$ represent a positive or negative SR for one of those K SR of URLLC, SR of SCell BFR and SR of eMBB.

In an implementation, $\lceil \log_2(K+1) \rceil$ bits representing a negative or positive SR, in ascending order of the values of schedule request ID configured in each of SR of URLLC, SR of SCell BFR and SR of eMBB.

In another implementation, the value of $\lceil \log_2(K+1) \rceil$ being k=1~K-1 representing a positive SR, for k-th SR configuration in ascending order of the values of schedule request ID configured in each of SR of URLLC and SR of eMBB. And the value of $\lceil \log_2(K+1) \rceil$ being K represent a positive in the SR of SCell BFR Among those SRs overlapping with the HARQ-ACK transmission, if one or more SR of URLLC is positive, the UE reports the positive for one SR of URLLC. If no SR of URLLC is positive but SR of SCell BFR is positive, the UE reports the positive for the SR of SCell BFR not matter the SR of eMBB is positive or negative.

Alt#2: There are K1 SR of URLLC, K2 SR of SCell BFR and K3 SR of eMBB that overlap with the HARQ-ACK transmission with PUCCH format 2/3/4, then the UE append $\lceil \log_2(K_1+1) \rceil + \lceil \log_2(K_2+1) \rceil + \lceil \log_2(K_3+1) \rceil$ bits to the CSI reporting information bits and the UE transmits totally $\lceil \log_2(K_1+1) \rceil + \lceil \log_2(K_2+1) \rceil + \lceil \log_2(K_3+1) \rceil + O_{CSI}$ bits in the PUCCH resources configured for CSI reporting transmission.

Where $\lceil \log_2(K_1+1) \rceil$ bits representing a negative or positive SR, for those SR of URLLC in ascending order of the values of schedulingRequestResourceId of those SRs of URLLC.

Where $\lceil \log_2(K_2+1) \rceil$ bits representing a negative or positive SR, for those SR of SCell BFR in ascending order of the values of schedulingRequestResourceId of those SRs of SCell BFR.

In one example, the UE is configured with one SR of SCell BFR, then there is 1 bit representing a negative or positive SR for the SR of SCell BFR.

Where $\lceil \log_2(K_3+1) \rceil$ bits representing a negative or positive SR, for those SR of eMBB in ascending order of the values of schedulingRequestResourceId of those SRs of eMBB.

FIG. 3 is a schematic structural composition diagram of an apparatus for uplink information transmission according to an implementation of the present disclosure, and is applied to a UE. As illustrated in FIG. 3, the apparatus for uplink information transmission includes a determination unit 301 and a transmission unit 302.

The determination unit 301 is configured to determine a priority rule.

The transmission unit 302 is configured to transmit at least one of first uplink information or second uplink information based on the priority rule.

The first uplink information includes a first SR that is dedicatedly configured for serving cell (SCell) beam failure recovery.

In an implementation, the second uplink information includes at least one of the following:
a second SR for enhanced mobile broadband (eMBB);
a first hybrid automatic repeat request-acknowledgement (HARQ-ACK) for eMBB;
a third SR for ultra reliable low latency communication (URLLC); or
a second HARQ-ACK for URLLC.

In an implementation, the priority rule is used for indicating that: a priority of the first SR is higher than a priority of the third SR, the priority of the third SR is higher than a priority of the second HARQ-ACK, the priority of the second HARQ-ACK is higher than a priority of the first HARQ-ACK, and the priority of the first HARQ-ACK is higher than a priority of the second SR.

In an implementation, the priority rule is used for indicating that a priority of the third SR is higher than a priority of the first SR, the priority of the first SR is higher than a priority of the second HARQ-ACK, the priority of the second HARQ-ACK is higher than a priority of the first HARQ-ACK, and the priority of the first HARQ-ACK is higher than a priority of the second SR.

In an implementation, the priority rule is used for indicating that a priority of the third SR is higher than a priority of the second HARQ-ACK, the priority of the second HARQ-ACK is higher than a priority of the first SR, the priority of the first SR is higher than a priority of the first HARQ-ACK, and the priority of the first HARQ-ACK is higher than a priority of the second SR.

In an implementation, the priority rule is used for indicating that a priority of the third SR is higher than a priority of the second HARQ-ACK, the priority of the second HARQ-ACK is higher than a priority of the first HARQ-ACK, the priority of the first HARQ-ACK is higher than a priority of the first SR, and the priority of the first SR is higher than a priority of the second SR.

In an implementation, the priority rule is used for indicating that a priority of the first SR is higher than a priority of the second HARQ-ACK, the priority of the second HARQ-ACK is higher than a priority of the third SR, the priority of the third SR is higher than a priority of the first HARQ-ACK, and the priority of the first HARQ-ACK is higher than a priority of the second SR.

In an implementation, the priority rule is used for indicating that a priority of the second HARQ-ACK is higher than a priority of the first SR, the priority of the first SR is higher than a priority of the third SR, the priority of the third SR is higher than a priority of the first HARQ-ACK, and the priority of the first HARQ-ACK is higher than a priority of the second SR.

In an implementation, the priority rule is used for indicating that a priority of the second HARQ-ACK is higher than a priority of the third SR, the priority of the third SR is higher than a priority of the first SR, the priority of the first SR is higher than a priority of the first HARQ-ACK, and the priority of the first HARQ-ACK is higher than a priority of the second SR.

In an implementation, the priority rule is used for indicating that a priority of the second HARQ-ACK is higher than a priority of the third SR, the priority of the third SR is higher than a priority of the first HARQ-ACK, the priority of the first HARQ-ACK is higher than a priority of the first SR, and the priority of the first SR is higher than a priority of the second SR.

In an implementation, a priority of the first SR is lower than a priority of the third SR and a priority of the second HARQ-ACK, and the priority of the first SR is higher than a priority of the second SR and the priority of the first HARQ-ACK, and a first physical uplink control channel (PUCCH) for carrying the first SR and a second PUCCH for carrying HARQ-ACK information have an overlapping portion within one time slot. If the second PUCCH uses PUCCH format 0, the transmission unit 302 is configured to transmit at least one of the first SR or the HARQ-ACK information according to a first transmission mode; or, if the second PUCCH uses PUCCH format 1, the transmission unit 302 is configured to transmit at least one of the first SR or the HARQ-ACK information according to a second transmission mode.

In an implementation, the HARQ-ACK information is of a type of the first HARQ-ACK or the second HARQ-ACK. If the first SR is a positive SR, the transmission unit 302 is configured to transmit the PUCCH in a resource using PUCCH format 0 in one or more physical resource blocks (PRBs) for HARQ-ACK information; or, if the first SR is a negative SR, the transmission unit 302 is configured to transmit the PUCCH in a resource using PUCCH format 0 for the HARQ-ACK information as configured.

In an implementation, the HARQ-ACK information is of a type of the second HARQ-ACK, and if the first PUCCH uses PUCCH format 0, the transmission unit 302 is configured to transmit the HARQ-ACK information on the second PUCCH; or, if the first PUCCH uses PUCCH format 1, and the first SR is a positive SR, the transmission unit 302 is configured to transmit the HARQ-ACK information on the first PUCCH; or, if the first PUCCH uses PUCCH format 1, and the first SR is a negative SR, the transmission unit 302 is configured to transmit the HARQ-ACK information on the second PUCCH.

In an implementation, the HARQ-ACK information is of a type of the first HARQ-ACK, and if the first SR is a positive SR, and the first PUCCH uses PUCCH format 0, the transmission unit 302 is configured to transmit the first SR on the first PUCCH; if the first SR is a negative SR, and the first PUCCH uses PUCCH format 1, the transmission unit 302 is configured to transmit the HARQ-ACK information on the first PUCCH; or, if the first SR is a negative SR, the transmission unit 302 is configured to transmit the HARQ-ACK information on the second PUCCH.

In an implementation, a priority of the first SR is lower than a priority of the third SR; and the priority of the first SR is higher than a priority of the second SR, and a transmission opportunity for carrying the third SR and a transmission opportunity for carrying the first SR have overlapping parts within one slot or one sub-slot. If the third SR is a positive SR, the transmission unit 302 is configured to discard the first SR; or, if the third SR is a negative SR and the first SR is a positive SR, the transmission unit 302 is configured to transmit the first SR.

In an implementation, a priority of the first SR is lower than a priority of the third SR; and the priority of the first SR is higher than a priority of a second SR, and a transmission opportunity for carrying the second SR and a transmission opportunity for carrying the first SR have overlapping parts in one time slot or one sub-slot. If the first SR is a positive SR, the transmission unit 302 is configured to discard the second SR; or, if the first SR is a negative SR and the second SR is a positive SR, the transmission unit 302 is configured to transmit the second SR.

In an implementation, a priority of the first SR is lower than a priority of the third SR; and the priority of the first SR is higher than a priority of a second SR, a transmission opportunity for carrying the second SR and a transmission opportunity for carrying the first SR have overlapping parts in one time slot or one sub-slot. If the first SR is a positive SR, the transmission unit 302 is configured to discard the second SR; or, if the first SR is a negative SR and the second SR is a positive SR, the transmission unit 302 is configured to transmit the second SR.

In an implementation, a priority of the first SR is lower than a priority of the third SR; and the priority of the first SR is higher than a priority of the second SR, and the transmission unit 302 is configured to, if the third SR is a positive SR, report the third SR, and not report the first SR.

In an implementation, a priority of the first SR is lower than a priority of the third SR, and a priority of the first SR is higher than a priority of the second SR, and if the first SR is a positive SR, the transmission unit 302 is configured to report the first SR, but not report the second SR.

In an implementation, the PUCCH for carrying HARQ-ACK information, a transmission opportunity for carrying the first SR, and a transmission opportunity for carrying the third SR have an overlapping portion, and the PUCCH for carrying HARQ-ACK information uses PUCCH format 2/3/4.

In an implementation, a transmission resource for target information and transmission resources for K SRs have an overlapping portion, the K SRs include: at least one first SR, at least one second SR, at least one third SR, or any combination thereof, K is a positive integer.

The transmission unit 302 is configured to append $\lceil \log_2(K+1) \rceil$-bit SR information to O-bit target information, to obtain $O+\lceil \log_2(K+1) \rceil$-bit uplink information, and transmit the $O+\lceil \log_2(K+1) \rceil$-bit uplink information on the second PUCCH. The second PUCCH is a PUCCH configured for the target information, and the second PUCCH uses PUCCH format 2/3/4.

In an implementation, a transmission resource for target information, $K_1$ transmission resources for the first SR, $K_2$ transmission resources for the second SR, and $K_3$ transmission resources for the third SR have an overlapping portion, $K_1$, $K_2$, and $K_3$ are positive integers.

The transmission unit 302 is configured to: append $\lceil\log_2(K_1+1)\rceil$-bit first SR information, $\lceil\log_2(K_2+1)\rceil$-bit second SR information, and $\lceil\log_2(K_3+1)\rceil$-bit third SR information to the O-bit target information, to obtain $\lceil\log_2(K_1+1)\rceil+\lceil\log_2(K_2+1)\rceil+\lceil\log_2(K_3+1)\rceil$+O-bit uplink information; and transmit the $\lceil\log_2(K_1+1)\rceil+\lceil\log_2(K_2+1)\rceil+\lceil\log_2(K_3+1)\rceil$+O-bit uplink information on the second PUCCH, wherein the second PUCCH is a PUCCH configured for the target information, and the second PUCCH uses PUCCH format 2/3/4.

In an implementation, the target information is HARQ-ACK information, and correspondingly, the O-bit target information is $O_{HARQ}$-bit HARQ-ACK information; or, the target information is CSI information, and the O-bit target information is $O_{CSI}$-bit CSI information.

Those skilled in the art should understand that the relevant description of the foregoing apparatus for uplink information transmission in the implementation of the present disclosure can be understood by referring to the relevant description of the method for uplink information transmission in the implementation of the present disclosure.

FIG. 4 illustrates a schematic structural diagram of a communication device 400 according to an implementation of the present disclosure. The communication device may be a user device or a network device. The communication device 400 illustrated in FIG. 4 includes a processor 410, and the processor 410 may call a computer program from a memory and run the computer program to implement the method in the implementations of the present disclosure.

Alternatively, as illustrated in FIG. 4, the communication device 400 may further include a memory 420. The processor 410 can call a computer program from the memory 420 and run the computer program to implement the method in the implementations of the present disclosure.

The memory 420 may be a separate device independent of the processor 410, or may be integrated in the processor 410.

Alternatively, as illustrated in FIG. 4, the communication device 400 may further include a transceiver 430, and the processor 410 may control the transceiver 430 to communicate with other devices, specifically, may send information or data to other devices, or receive other information or data sent by the device.

The transceiver 430 may include a transmitter and a receiver. The transceiver 430 may further include antennas, and the number of antennas may be one or more.

Alternatively, the communication device 400 may specifically be a network device according to an implementation of the present disclosure, and the communication device 400 may implement the corresponding process implemented by the network device in each method of the implementation of the present disclosure.

Alternatively, the communication device 400 may specifically be a mobile terminal/user device according to an implementation of the present disclosure, and the communication device 400 may implement the corresponding process implemented by the mobile terminal/user device in each method of the implementation of the present disclosure. For simplicity, the description will not be repeated here.

Figure 5:
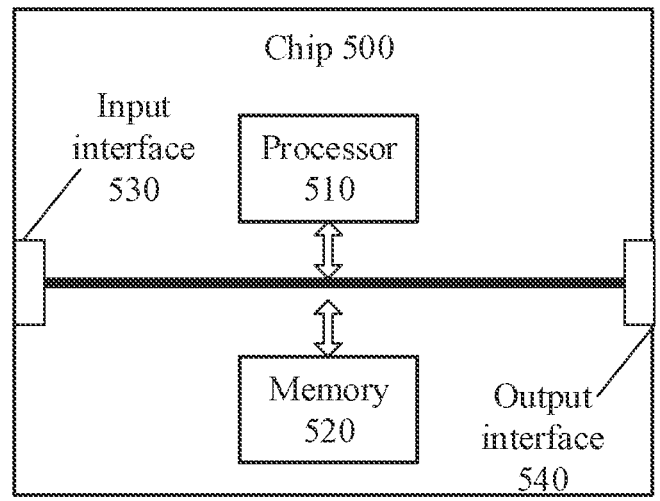
FIG. 5 illustrates a block diagram of a chip according to an implementation of the present disclosure.

FIG. 5 illustrates a schematic structural diagram of a chip according to an implementation of the present disclosure. The chip 500 illustrated in FIG. 5 includes a processor 510, and the processor 510 can call a computer program from the memory and run the computer program to implement the method in the implementation of the present disclosure.

Alternatively, as illustrated in FIG. 5, the chip 500 may further include a memory 520. The processor 510 can call a computer program from the memory 520 and run the computer program to implement the method in the implementations of the present disclosure.

The memory 520 may be a separate device independent of the processor 510, or may be integrated in the processor 510.

Alternatively, the chip 500 may further include an input interface 530. The processor 510 can control the input interface 530 to communicate with other devices or chips. Specifically, it can obtain information or data sent by other devices or chips.

Alternatively, the chip 500 may further include an output interface 540. The processor 510 can control the output interface 540 to communicate with other devices or chips. Specifically, it can output information or data to other devices or chips.

Alternatively, the chip may be applied to the network device in the implementation of the present disclosure, and the chip may implement the corresponding process implemented by the network device in each method of the implementation of the present disclosure. For simplicity, the description will not be repeated here.

Alternatively, the chip can be applied to the mobile terminal/user equipment in the implementations of the present disclosure, and the chip can implement the corresponding processes implemented by the mobile terminal/user equipment in the methods of the implementations of the present disclosure. For simplicity, the description will not be repeated here.

It should be understood that the chips mentioned in the implementations of the present disclosure may also be referred to as system-on-chips, system chips, chip systems, or system-on-chip chips.

Figure 6:
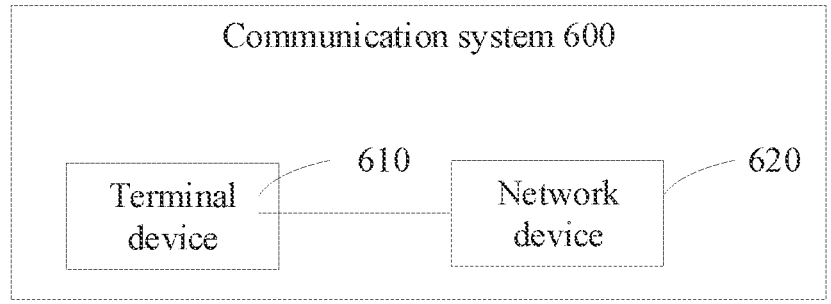
FIG. 6 illustrates a schematic block diagram of a communication system according to an implementation of the present disclosure.

FIG. 6 illustrates a schematic block diagram of a communication system 600 according to an implementation of the present disclosure. As illustrated in FIG. 6, the communication system 600 includes a user equipment (UE) 610 and a network device 620.

The UE 610 can implement the corresponding functions implemented by the user equipment in the above method, and the network device 620 can implement the corresponding functions implemented by the network equipment in the above method. For simplicity, the description will not be repeated here.

It should be understood that the processor in the implementation of the present disclosure may be an integrated circuit chip, which has signal processing capabilities. In the implementation process, each step of the foregoing method implementation may be completed by an integrated logic circuit of hardware in a processor or instructions in the form of software. The foregoing processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logical block diagrams disclosed in the implementations of the present disclosure may be implemented or executed. The general-purpose processor may be a microprocessor or the processor may be any conventional processor or the like. The steps of the method disclosed in conjunction with the implementations of the present disclosure may be directly embodied and executed by a hardware decoding processor, or may be executed and completed by a combination of hardware and software modules in the decoding processor. The software module may be located in a mature storage medium in the art, such as random access memory, flash memory, read-only memory, programmable read-only memory, or electrically erasable programmable memory, and registers. The storage medium is located in the memory, and the processor reads the information in the memory and completes the steps of the above method in combination with its hardware.

It can be understood that the memory in the implementations of the present disclosure may be volatile memory or non-volatile memory, or may include both volatile and non-volatile memory. Among them, the non-volatile memory can be read-only memory (Read-Only Memory, ROM), programmable read-only memory (Programmable ROM, PROM), erasable programmable read-only memory (Erasable PROM, EPROM), electronically Erasable Programmable Read Only Memory (Electrically EPROM, EEPROM) or flash memory. The volatile memory may be a random access memory (Random Access Memory, RAM), which is used as an external cache. By way of example but not limitation, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double SDRAM, DDR SDRAM), enhanced synchronous dynamic random access memory (Enhanced SDRAM, ESDRAM), synchronous connection dynamic random access memory (Synchlink DRAM, SLDRAM)) And direct memory bus random access memory (Direct Rambus RAM, DR RAM). It should be noted that the memories of the systems and methods described herein are intended to include, but are not limited to these and any other suitable types of memories.

It should be understood that the foregoing memory is exemplary but not limiting, for example, the memory in the implementations of the present disclosure may also be static random access memory (static RAM, SRAM), dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is to say, the memories in the implementations of the present disclosure are intended to include but are not limited to these and any other suitable types of memories.

Implementations of the present disclosure also provide a computer-readable storage medium for storing computer programs.

Alternatively, the computer-readable storage medium may be applied to the network device in the implementations of the present disclosure, and the computer program causes the computer to execute the corresponding process implemented by the network device in each method of the implementations of the present disclosure. For brevity, here No longer.

Alternatively, the computer-readable storage medium may be applied to the mobile terminal/user equipment in the implementations of the present disclosure, and the computer program causes the computer to execute the corresponding process implemented by the mobile terminal/user equipment in each method of the implementations of the present disclosure. The description will not be elaborated herein for brevity.

An implementation of the present disclosure also provides a computer program product, including computer program instructions.

Alternatively, the computer program product can be applied to the network device in the implementations of the present disclosure, and the computer program instructions cause the computer to execute the corresponding process implemented by the network device in each method of the implementation of the present disclosure. The description will not be elaborated herein for brevity.

Alternatively, the computer program product may be applied to the mobile terminal/user equipment in the implementations of the present disclosure, and the computer program instructions cause the computer to execute the corresponding process implemented by the mobile terminal/user equipment in each method of the implementations of the present disclosure. The description will not be elaborated herein for brevity.

An implementation of the present disclosure also provides a computer program.

Alternatively, the computer program can be applied to the network device in the implementations of the present disclosure. When the computer program runs on the computer, the computer is allowed to execute the corresponding process implemented by the network device in each method of the implementation of the present disclosure. The description will not be elaborated herein for brevity.

Alternatively, the computer program can be applied to the mobile terminal/user equipment in the implementations of the present disclosure, and when the computer program runs on the computer, the computer is implemented by the mobile terminal/user equipment in performing various methods of the implementations of the present disclosure. The description will not be elaborated herein for brevity.

Those of ordinary skill in the art may realize that the units and algorithm steps of the examples described in conjunction with the implementations disclosed herein can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of this disclosure.

Those skilled in the art can clearly understand that for the convenience and conciseness of the description, the specific working process of the system, device and unit described above can refer to the corresponding process in the foregoing method implementations. The description will not be elaborated herein for brevity.

In the several implementations provided in this disclosure, it should be understood that the disclosed system, device, and method may be implemented in other ways. For example, the device implementations described above are only schematic. For example, the division of the units is only a division of logical functions. In actual implementation, there may be other divisions, for example, multiple units or components may be combined or Can be integrated into another system, or some features can be ignored, or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place, or may be distributed on multiple network units. Some or all of the units may be selected according to actual needs to achieve the purpose of the solution of this implementation.

In addition, each functional unit in each implementation of the present disclosure may be integrated into one processing unit, or each unit may exist alone physically, or two or more units may be integrated into one unit.

If the functions are implemented in the form of software functional units and sold or used as independent products, they can be stored in a computer-readable storage medium. Based on such an understanding, the technical solution of the present disclosure essentially or part of the contribution to the existing technology or part of the technical solution can be embodied in the form of a software product, and the computer software product is stored in a storage medium, including Several instructions are used to enable a computer device (which may be a personal computer, a server, or a network device, etc.) to perform all or part of the steps of the methods described in the implementations of the present disclosure. The foregoing storage media include: U disk, mobile hard disk, read-only memory (Read-Only Memory, ROM), random access memory (Random Access Memory, RAM), magnetic disk or optical disk and other media that can store program codes.

The above is only the specific implementation of this disclosure, but the scope of protection of this disclosure is not limited to this, any person skilled in the art can easily think of changes or replacements within the technical scope disclosed in this disclosure. It should be covered by the scope of protection of this disclosure. Therefore, the protection scope of the present disclosure shall be subject to the protection scope of the claims.

FIG. 5 illustrates a block diagram of a UE 500 according to an implementation of the disclosure. The electronic device may be any device with a computing processing capability such as a terminal or a server. As illustrated in FIG. 5, the electronic device may include a processor 510. The processor 510 may call and execute the computer programs in a memory to execute the method in the implementations of the disclosure.

In at least one implementation, as illustrated in FIG. 5, the communication device 500 may further include a memory 520. The processor 510 may call and execute the computer programs in the memory 520 to execute the method in the implementations of the disclosure.

The memory 520 may be a separate device from the processor 510, or may be integrated into the processor 510.

In at least one implementation, as illustrated in FIG. 5, the UE 500 may further include a transceiver 530. The processor 510 may control the transceiver 530 to communicate with another device. Specifically, the processor 510 may control the transceiver 530 to send information or data to another device, or receive information or data from another device.

The transceiver 530 may include a transmitter and a receiver. The transceiver 530 may further include one or more antennas.

Alternatively, the UE 500 may specifically be a terminal/mobile terminal in the implementations of the disclosure. The UE 500 may implement a corresponding process implemented by the terminal/mobile terminal in each method implementation of the disclosure, which will not be elaborated herein for brief description.

FIG. 6 illustrates a block diagram of a chip according to an implementation of the disclosure. As illustrated in FIG. 6, the chip 600 includes a processor 610. The processor 610 may call and execute the computer programs in a memory to execute the method in the implementations of the disclosure.

In at least one implementation, as illustrated in FIG. 6, the chip 600 may further include a memory 620. The processor 610 may call and execute the computer programs in the memory 620 to execute the method in the implementations of the disclosure.

The memory 620 may be a separate device from the processor 610, or may be integrated into the processor 610.

In at least one implementation, the chip 600 may further include an input interface 630. The processor 610 may control the input interface 630 to communicate with another device or chip. Specifically, the processor 610 may control the input interface 7630 to obtain information or data from another device or chip.

In at least one implementation, the chip 600 may further include an output interface 640. The processor 610 may control the output interface 640 to communicate with another device or chip. Specifically, the processor 610 may control the output interface 640 to send information or data to another device or chip.

In at least one implementation, the chip may be applied to the network device in the implementations of the disclosure. The chip may implement a corresponding process implemented by the network device in each method implementation of the disclosure, which will not be elaborated herein for brief description.

In at least one implementation, the chip may be applied to the terminal/mobile terminal in the implementations of the disclosure. The chip may implement a corresponding process implemented by the terminal/mobile terminal in each method implementation of the disclosure, which will not be elaborated herein for brief description.

It is to be understood that in the implementations of the disclosure, the chip may also be referred to as a system level chip, a system chip, a chip system or a system-on-chip.

It is to be understood that in the implementations of the disclosure, the processor may be an integrated circuit chip with a signal processing capability. In an implementation process, each operation of the method implementations may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the implementations of the disclosure may be implemented or executed. The universal processor may be a microprocessor or the processor may also be any related processor and the like. The operations of the methods disclosed in combination with the implementations of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and performs the operations of the above methods in combination with hardware of the processor.

It may be understood that the memory in the implementation of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

The implementations of the disclosure also provide a computer-readable storage medium for storing one or more computer programs.

In at least one implementation, the computer-readable storage medium may be applied in the network device of the implementations of the disclosure. The computer programs may enable a processor to perform the corresponding process implemented by the network device in each method implementation of the disclosure, which will not be elaborated herein for brevity.

In at least one example, the computer-readable storage medium may be applied in the terminal/mobile terminal of the implementations of the disclosure. The computer programs may enable a processor to perform the corresponding process implemented by the terminal/mobile terminal in each method implementation of the disclosure, which will not be elaborated herein for brevity.

The implementations of the disclosure also provide a computer program product. The computer program product includes one or more computer program instructions.

In at least one implementation, the computer program product may be applied in the network device of the implementations of the disclosure. The computer program instructions may enable a processor to perform the corresponding process implemented by the network device in each method implementation of the disclosure, which will not be elaborated herein for brevity.

In at least one example, the computer program product may be applied in the terminal/mobile terminal of the implementations of the disclosure. The computer program instructions may enable a processor to perform the corresponding process implemented by the terminal/mobile terminal in each method implementation of the disclosure, which will not be elaborated herein for brevity.

The implementations of the disclosure also provide a computer program.

In at least one implementation, the computer program may be applied in the network device of the implementations of the disclosure. The computer program, when executed by a processor, enables a processor to perform the corresponding process implemented by the network device in each method implementation of the disclosure, which will not be elaborated herein for brevity.

In at least one example, the computer program may be applied in the terminal/mobile terminal of the implementations of the disclosure. The computer program, when executed by a processor, enables a processor to perform the corresponding process implemented by the terminal/mobile terminal in each method implementation of the disclosure, which will not be elaborated herein for brevity.

Those of ordinary skill in the art may realize that the units and algorithm operations of each example described in combination with the implementations disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn that specific working processes of the system, device and unit described above may refer to the corresponding processes in the method implementation and will not be elaborated herein for convenient and brief description.

In some implementations according to the disclosure, it is to be understood that the disclosed system, apparatus and method may be implemented in another manner. For example, the apparatus implementation described above is only schematic, and for example, division of the units is only a logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, the device or the units, and may be electrical and mechanical or in other forms.

The units described as separate parts may or may not be separated physically, and parts displayed as units may or may not be physical units, namely may be located in a same place, or may be distributed among multiple network units. Part or all of the units may be selected according to a practical requirement to achieve the purpose of the solutions of the implementations.

In addition, each functional unit in each implementation of the disclosure may be integrated into a processing unit, each unit may exist physically independently, or two or more units may be integrated into a unit.

When being realized in form of software functional unit and sold or used as an independent product, the function may also be stored in a computer-readable storage medium. Based on such an understanding, part of technical solutions of the disclosure substantially making contributions to the prior art may be embodied in form of a software product, and the computer software product is stored in a storage medium, including a plurality of instructions which enable a computer device (which may be a personal computer, a server, a network device or the like) to execute all or part of the operations of the method in each implementation of the disclosure. The abovementioned storage medium includes: various media capable of storing program codes, such as a U disk, a mobile hard disk, a ROM, a RAM, a magnetic disk or an optical disk.

The above is only the specific implementations of the disclosure and not intended to limit the scope of the disclosure. Any variations or replacements apparent to those skilled in the art within the technical scope disclosed by the disclosure shall fall within the scope of the disclosure. Therefore, the scope of the disclosure shall be subject to the scope of the claims.

The invention claimed is:

1. A method for uplink information transmission, comprising:
   determining, by a user equipment (UE), a priority rule; and
   transmitting, by the UE, at least one of first uplink information or second uplink information based on the priority rule, wherein the first uplink information comprises a first scheduling request (SR) that is dedicatedly configured for serving cell (SCell) beam failure recovery; wherein a transmission resource for target information and transmission resources for K SRs have an overlapping portion, the K SRs include: at least the first SR, at least one second SR, at least one third SR, or any combination thereof, K is a positive integer, and wherein the transmitting, by the UE, at least one of first uplink information or second uplink information based on the priority rule comprises:

appending, by the UE, $\lceil \log_2(K+1) \rceil$-bit SR information to O-bit target information, to obtain $0+\lceil \log_2(K+1) \rceil$-bit uplink information; and transmitting, by the UE, the $0+\lceil \log_2(K+1) \rceil$-bit uplink information on the second PUCCH, wherein the second PUCCH is a PUCCH configured for the target information, and the second PUCCH uses PUCCH format 2/3/4;

wherein the target information is HARQ-ACK information, and the O-bit target information is $O_{HARQ}$-bit HARQ-ACK information; or, the target information is CSI information, and the O-bit target information is $O_{CSI}$-bit CSI information, where $O_{HARQ}$ is the number of HARQ-ACK information bits and where $O_{CST}$ is the number of CSI information bits.

2. The method according to claim 1, wherein the second uplink information comprises at least one of the following:
a second SR for enhanced mobile broadband (eMBB);
a first hybrid automatic repeat request-acknowledgement (HARQ-ACK) for eMBB;
a third SR for ultra reliable low latency communication (URLLC); or
a second HARQ-ACK for URLLC.

3. The method according to claim 2, wherein the priority rule is used for indicating that:
a priority of the first SR is higher than a priority of the third SR,
the priority of the third SR is higher than a priority of the second HARQ-ACK,
the priority of the second HARQ-ACK is higher than a priority of the first HARQ-ACK, and
the priority of the first HARQ-ACK is higher than a priority of the second SR,
or, wherein the priority rule is used for indicating that:
a priority of the third SR is higher than a priority of the first SR,
the priority of the first SR is higher than a priority of the second HARQ-ACK,
the priority of the second HARQ-ACK is higher than a priority of the first HARQ-ACK, and
the priority of the first HARQ-ACK is higher than a priority of the second SR,
or, wherein the priority rule is used for indicating that:
a priority of the third SR is higher than a priority of the second HARQ-ACK,
the priority of the second HARQ-ACK is higher than a priority of the first SR,
the priority of the first SR is higher than a priority of the first HARQ-ACK, and
the priority of the first HARQ-ACK is higher than a priority of the second SR,
or, wherein the priority rule is used for indicating that:
a priority of the third SR is higher than a priority of the second HARQ-ACK,
the priority of the second HARQ-ACK is higher than a priority of the first HARQ-ACK,
the priority of the first HARQ-ACK is higher than a priority of the first SR, and
the priority of the first SR is higher than a priority of the second SR,
or, wherein the priority rule is used for indicating that:
a priority of the first SR is higher than a priority of the second HARQ-ACK,
the priority of the second HARQ-ACK is higher than a priority of the third SR,
the priority of the third SR is higher than a priority of the first HARQ-ACK, and
the priority of the first HARQ-ACK is higher than a priority of the second SR,
or, wherein the priority rule is used for indicating that:
a priority of the second HARQ-ACK is higher than a priority of the first SR,
the priority of the first SR is higher than a priority of the third SR,
the priority of the third SR is higher than a priority of the first HARQ-ACK, and
the priority of the first HARQ-ACK is higher than a priority of the second SR,
or, wherein the priority rule is used for indicating that:
a priority of the second HARQ-ACK is higher than a priority of the third SR,
the priority of the third SR is higher than a priority of the first SR,
the priority of the first SR is higher than a priority of the first HARQ-ACK, and
the priority of the first HARQ-ACK is higher than a priority of the second SR,
or, wherein the priority rule is used for indicating that:
a priority of the second HARQ-ACK is higher than a priority of the third SR,
the priority of the third SR is higher than a priority of the first HARQ-ACK,
the priority of the first HARQ-ACK is higher than a priority of the first SR, and
the priority of the first SR is higher than a priority of the second SR.

4. The method according to claim 2, wherein a priority of the first SR is lower than a priority of the third SR and a priority of the second HARQ-ACK, and the priority of the first SR is higher than a priority of the second SR and the priority of the first HARQ-ACK, and
a first physical uplink control channel (PUCCH) for carrying the first SR and a second PUCCH for carrying HARQ-ACK information have an overlapping portion within one time slot, and
wherein the transmitting, by the UE, at least one of first uplink information or second uplink information based on the priority rule comprises:
if the second PUCCH uses PUCCH format 0, transmitting, by the UE, at least one of the first SR or the HARQ-ACK information according to a first transmission mode; or,
if the second PUCCH uses PUCCH format 1, transmitting, by the UE, at least one of the first SR or the HARQ-ACK information according to a second transmission mode.

5. The method according to claim 4, wherein the HARQ-ACK information is of a type of the first HARQ-ACK or the second HARQ-ACK, and
wherein the transmitting, by the UE, at least one of the first SR or the HARQ-ACK information according to the first transmission mode comprises:

if the first SR is a positive SR, transmitting, by the UE, the PUCCH in a resource using PUCCH format 0 in one or more physical resource blocks (PRBs) for HARQ-ACK information; or, if the first SR is a negative SR, transmitting, by the UE, the PUCCH in a resource using PUCCH format 0 for the HARQ-ACK information as configured.

6. The method according to claim 4, wherein the HARQ-ACK information is of a type of the first HARQ-ACK, and the transmitting, by the UE, at least one of the first SR or the HARQ-ACK information according to the first transmission mode comprises:

if the first SR is a positive SR, transmitting, by the UE, the first SR on the first PUCCH; or, if the first SR is a negative SR, transmitting, by the UE, the HARQ-ACK information on the second PUCCH.

7. The method according to claim 4, wherein the HARQ-ACK information is of a type of the second HARQ-ACK, and wherein transmitting, by the UE, at least one of the first SR or the HARQ-ACK information according to the second transmission mode comprises:

if the first PUCCH uses PUCCH format 0, transmitting, by the UE, the HARQ-ACK information on the second PUCCH; or, if the first PUCCH uses PUCCH format 1, and the first SR is a positive SR, transmitting, by the UE, the HARQ-ACK information on the first PUCCH; or, if the first PUCCH uses PUCCH format 1, and the first SR is a negative SR, transmitting, by the UE, the HARQ-ACK information on the second PUCCH.

8. The method according to claim 4, wherein the HARQ-ACK information is of a type of the first HARQ-ACK, and wherein transmitting, by the UE, at least one of the first SR or the HARQ-ACK information according to the second transmission mode comprises:

if the first SR is a positive SR, and the first PUCCH uses PUCCH format 0, transmitting, by the UE, the first SR on the first PUCCH; or if the first SR is a positive SR, and the first PUCCH uses PUCCH format 1, transmitting, by the UE, the HARQ-ACK information on the first PUCCH; or, if the first SR is a negative SR, transmitting, by the UE, the HARQ-ACK information on the second PUCCH.

9. The method according to claim 2, wherein a priority of the first SR is lower than a priority of the third SR; and the priority of the first SR is higher than a priority of the second SR, a transmission opportunity for carrying the third SR and a transmission opportunity for carrying the first SR have overlapping parts within one slot or one sub-slot, and wherein the transmitting, by the UE, at least one of first uplink information or second uplink information based on the priority rule comprises:

if the third SR is a positive SR, discarding, by the UE, the first SR; or, if the third SR is a negative SR and the first SR is a positive SR, transmitting, by the UE, the first SR.

10. The method according to claim 2, wherein a priority of the first SR is lower than a priority of the third SR; and the priority of the first SR is higher than a priority of a second SR, a transmission opportunity for carrying the second SR and a transmission opportunity for carrying the first SR have overlapping parts in one time slot or one sub-slot, and wherein the transmitting, by the UE, at least one of first uplink information or second uplink information based on the priority rule comprises:

if the first SR is a positive SR, discarding, by the UE, the second SR; or, if the first SR is a negative SR and the second SR is a positive SR, transmitting, by the UE, the second SR.

11. The method according to claim 2, wherein a priority of the first SR is lower than a priority of the third SR; and the priority of the first SR is higher than a priority of the second SR, and wherein the transmitting, by the UE, at least one of first uplink information or second uplink information based on the priority rule comprises:

if the third SR is a positive SR, reporting, by the UE, the third SR, and not reporting the first SR.

12. The method according to claim 11, wherein the PUCCH for carrying HARQ-ACK information, a transmission opportunity for carrying the first SR, and a transmission opportunity for carrying the third SR have an overlapping portion, and the PUCCH for carrying HARQ-ACK information uses PUCCH format 2/3/4.

13. The method according to claim 2, wherein a priority of the first SR is lower than a priority of the third SR, and a priority of the first SR is higher than a priority of the second SR, and wherein the transmitting, by the UE, at least one of first uplink information or second uplink information based on the priority rule comprises:

if the first SR is a positive SR, reporting, by the UE, the first SR, and not reporting the second SR.

14. The method according to claim 1, wherein a transmission resource for target information, $K_1$ transmission resources for the first SR, $K_2$ transmission resources for the second SR, and $K_3$ transmission resources for the third SR have an overlapping portion, $K_1$, $K_2$, and $K_3$ are positive integers, and wherein the transmitting, by the UE, at least one of first uplink information or second uplink information based on the priority rule comprises:

appending, by the UE, $\lceil \log_2(K_1+1) \rceil$-bit first SR information, $\lceil \log_2(K_2+1) \rceil$-bit second SR information, and $\lceil \log_2(K_3+1) \rceil$-bit third SR information to the O-bit target information, to obtain $\lceil \log_2(K_1+1) \rceil + \lceil \log_2(K_2+1) \rceil + \lceil \log_2(K_3+1) \rceil$+O-bit uplink information; and transmitting, by the UE, the $\lceil \log_2(K_1+1) \rceil + \lceil \log_2(K_2+1) \rceil + \lceil \log_2(K_3+1) \rceil$+O-bit uplink information on the second PUCCH, wherein the second PUCCH is a PUCCH configured for the target information, and the second PUCCH uses PUCCH format 2/3/4.

15. A user equipment, comprising: a processor and a memory storing a computer program, the processor is configured to call and run the computer program stored in the memory, to execute following acts:

determining a priority rule; and transmitting at least one of first uplink information or second uplink information based on the priority rule, wherein the first uplink information comprises a first scheduling request (SR) that is dedicatedly configured for serving cell (SCell) beam failure recovery; wherein a transmission resource for target information and transmission resources for K SRs have an overlapping portion, the K SRs include: at least the first SR, at least one second SR, at least one third SR, or any combination thereof, K is a positive integer, and wherein the transmitting, by the UE, at least one of first uplink information or second uplink information based on the priority rule comprises:

appending, by the UE $\lceil \log_2(K+1) \rceil$-bit SRinformation to O-bit target information, to obtain $O+\lceil \log_2(K+1) \rceil$-bit uplink information; and transmitting, by the UE, the $O+\lceil \log_2(K+1) \rceil$-bit uplink information on the second PUCCH, wherein the second PUCCH is a PUCCH configured for the target information, and the second PUCCH uses PUCCH format 2/3/4;

wherein the target information is HARQ-ACK information, and the O-bit target information is $O_{HARQ}$-bit HARQ-ACK information; or, the target information is CSI information, and the O-bit target information is $O_{CSI}$-bit CSI information, where $O_{HARQ}$ is the number of HARQ-ACK information bits and where $O_{CSI}$ is the number of CSI information bits.

* * * * *